United States Patent
Hayashi et al.

(10) Patent No.: US 8,336,332 B2
(45) Date of Patent: *Dec. 25, 2012

(54) PROCESS FOR THE PRODUCTION OF GLASS MOLDED ARTICLE, OPTICAL ELEMENT PRODUCED BY THE PROCESS, AND METHOD OF TREATING GLASS

(75) Inventors: Kazutaka Hayashi, Tokyo (JP); Hiromasa Tawarayama, Tokyo (JP); Xuelu Zou, Tokyo (JP); Hiroshi Kawazoe, Kanagawa (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/409,376

(22) Filed: Mar. 1, 2012

(65) Prior Publication Data

US 2012/0151964 A1    Jun. 21, 2012

Related U.S. Application Data

(60) Division of application No. 12/149,815, filed on May 8, 2008, which is a continuation of application No. 10/892,206, filed on Jul. 16, 2004, now abandoned, which is a division of application No. 09/981,237, filed on Oct. 18, 2001, now Pat. No. 6,786,064.

(30) Foreign Application Priority Data

Oct. 23, 2000 (JP) ................. 2000-322765

(51) Int. Cl.
 *C03C 15/00* (2006.01)
 *C03B 23/00* (2006.01)
(52) U.S. Cl. ............ 65/30.1; 65/111; 65/102; 65/66; 65/32.1; 65/32.5

(58) Field of Classification Search ............. 65/30.11, 65/30.1, 32.1, 66, 111
See application file for complete search history.

(56) References Cited

U.S. PATENT DOCUMENTS

| | | | |
|---|---|---|---|
| 3,634,219 A | 1/1972 | Sinai | |
| 4,976,764 A | 12/1990 | Fujino | |
| 6,127,297 A | 10/2000 | Hashimoto | |
| 6,333,282 B1 | 12/2001 | Nakahata et al. | |

FOREIGN PATENT DOCUMENTS

| | | |
|---|---|---|
| JP | 6-32623 | 2/1994 |
| JP | 6-345481 | 12/1994 |
| JP | 7-97234 | 4/1995 |
| JP | 8-26750 | 1/1996 |

(Continued)

OTHER PUBLICATIONS

W.D. Kingery, et al, "Introduction to Ceramics", (1976), John Wiley and Sons, pp. 833-834.

(Continued)

*Primary Examiner* — Jason L. Lazorcik
(74) *Attorney, Agent, or Firm* — Nixon & Vanderhye P.C.

(57) ABSTRACT

Provided are a process for the production of a precision press-molded article having a high transmittance a method of treating a glass to color or decolor the glass, the process comprising heat-treating a press-molded article containing at least one selected from $WO_3$, $Nb_2O_5$ or $TiO_2$ in an oxidizing atmosphere to produce a glass molded article, and the method comprising heat-treating a colored glass containing at least one oxide of $WO_3$ and $Nb_2O_5$ in an oxidizing atmosphere to decolor the glass, or heat-treating a glass containing at least one oxide selected from $WO_3$, $Nb_2O_5$ or $TiO_2$ in a non-oxidizing atmosphere to color the glass.

5 Claims, 3 Drawing Sheets

FOREIGN PATENT DOCUMENTS

| | | |
|---|---|---|
| JP | 8-157231 | 6/1996 |
| JP | 3798268 B2 | 4/2006 |

OTHER PUBLICATIONS

Sato et al, "Low melting point optical glass", Machine translation of Japanese patent publication JP 08-157231, Accessed PAJ database Oct. 23, 2007.

DeJong et al ("Glass" in Ullmann's Encyclopedia of Industrial Chemistry, §6.2, p. 77, Copyright 2007 by John Wiley & Sons, Inc.).

Beals et al ("Effects of Titanium Dioxide in Glass", The Glass Industry, 1963, p. 495-501, and 530-531).

Bancroft et al ("Applied Colloid Chemistry: General Theory", McGraw-Hill Book Company, New York, 1921, p. 311-312).

PROCESS FOR THE PRODUCTION OF GLASS MOLDED ARTICLE, OPTICAL ELEMENT PRODUCED BY THE PROCESS, AND METHOD OF TREATING GLASS

CROSS REFERENCE TO RELATED APPLICATION

This application is a divisional of application Ser. No. 12/149,815 filed May 8, 2008, which in turn is a continuation of application Ser. No. 10/892,206 filed Jul. 16, 2004 now abandoned, which in turn is a divisional of application Ser. No. 09/981,237, filed Oct. 18, 2001, now U.S. Pat. No. 6,786,064, which in turn claims the priority of Japanese application 2000-322765, filed Oct. 23, 2000, the entire content of each of which is hereby incorporated by reference in this application.

DETAILED DESCRIPTION OF THE INVENTION

1. Field of the Invention

The present invention relates to a process for the production of a glass molded article, an optical element produced by the process, and a method of treating a glass. More specifically, it relates to a process for efficiently producing a transparent glass molded article by decoloring a press-molded product, an optical element produced by the above production process and a method of treating a glass, particularly, an optical glass, for coloring and decoloring the glass.

2. Prior Art of the Invention

In recent years, as a technique for mass-producing glass optical elements such as aspherical lenses, increasing interests are invited to a precision press-molding technique of press-molding a glass material made of an optical glass with a mold having a transfer molding surface having a reversal form of an optical element as an end product thereby to obtain a high-precision optical element without cutting and polishing after the press-molding. In the above precision press-molding, press-molding is carried out in a non-oxidizing atmosphere of nitrogen so that the transfer molding surface is not oxidized at a high temperature.

In the field of the above optical glass, there is a demand for reversibly decolorable and colorable glasses. It is general practice to incorporate an ion of a transition metal such as Fe or Co, a colloid of cadmium sulfide, gold or silver, or a sulfide etc. into a glass. In this practice, a glass can be only colored, and a glass that is once colored cannot be rendered colorless or transparent. As a glass that permits reversible control of the color degree, there is known a so-called photochromic glass obtained by incorporating silver chloride. This glass contains a great number of fine particles that are dispersed or precipitated in the glass.

Meanwhile, a $P_2O_5$—$WO_3$-containing glass is available as a glass suitable for the above precision press-molding, and this glass is also highly useful as an optical glass that exhibits high-refractivity high-dispersion properties. When optical elements such as a lens made of a $P_2O_5$—$WO_3$-containing glass are produced by precision press-molding, there is a problem that a glass that is transparent before the press-molding is colored after the press-molding so that the transparency of the optical glass decreases. The coloring problem caused on a glass article by precision press-molding even if a glass material for the precision press-molding is colorless and transparent takes place not only in the $P_2O_5$—$WO_3$-containing glass but also in a $P_2O_5$—$Nb_2O_5$-containing glass and a $P_2O_5$—$TiO_2$-containing glass.

Since the photochromic glass that is reversibly colorable and decolorable contains a great number of fine particles dispersed and precipitated in the glass, it has a problem that it causes light scattering and is sometimes not suitable for use where particularly high homogeneity is required.

The above problems can be all overcome by controlling the color degree of a glass.

SUMMARY OF THE INVENTION

Under the circumstances, it is an object of the present invention to provide a process for efficiently producing a transparent glass molded article, particularly a precision press-molded article having a high transmittance, an optical element obtained by said process, and a treatment method of effectively coloring and decoloring a glass, particularly, an optical glass.

For achieving the above object, the present inventors have made diligent studies and as a result found the following. A $P_2O_5$—$WO_3$-containing glass, a $P_2O_5$—$Nb_2O_5$-containing glass and a $P_2O_5$—$TiO_2$-containing glass are colored because W ion, Nb ion and Ti ion in the glasses are reduced due to exposure to a non-oxidizing atmosphere when the glasses are precision press-molded in a high-temperature state. Therefore, the $P_2O_5$—$WO_3$-containing glass, the $P_2O_5$—$Nb_2O_5$-containing glass and the $P_2O_5$—$TiO_2$-containing glass are colored by exposing the glasses to a non-oxidizing atmosphere (a more remarkable change takes place in a reducing atmosphere) at a high temperature. On the other hand, W ion, Nb ion and Ti ion are oxidized by exposing the glasses to an oxidizing atmosphere in a high-temperature state, so that the color degree can be decreased and, further, that the above-colored glass can be decolored. And, it is difficult to control the color degree by merely heating the glass, and the color degree is greatly influenced by oxidizing and reducing atmospheres to which the glass under heat is exposed.

The present invention has been completed on the basis of the above findings.

That is, (1) according to the present invention, there is provided a process for producing a glass molded article by press-molding a glass under heat in a non-oxidizing atmosphere, the process comprising press-molding a glass containing at least one oxide selected from $WO_3$, $Nb_2O_5$ or $TiO_2$, to prepare a glass molded article, and then heat-treating the glass molded article in an oxidizing atmosphere.

(2) According to the present invention, there is also provided an optical element obtained by the above method.

(3) According to the present invention, there is further provided a method of treating a glass, comprising heat-treating a colored glass containing at least one oxide of $WO_3$ and $Nb_2O_5$ in an oxidizing dry atmosphere, to decolor the glass.

(4) According to the present invention, there is still further provided a method of treating a glass, comprising heat-treating a glass containing at least one oxide selected from $WO_3$, $Nb_2O_5$ or $TiO_2$ in a non-oxidizing atmosphere, to color the glass.

PREFERRED EMBODIMENTS OF THE INVENTION

First, the process for the production of a glass molded article, the method of treating a glass and the mechanism of coloring and decoloring, in the present invention, will be explained below.

It is considered that the following mechanism causes the phenomenon of coloring and decoloring (discoloration) of a $WO_3$-containing phosphate glass that exhibits high refractivity and high dispersion. When the above composition-based glasses having different color degrees are measured for electron spin resonance absorptions, it is found that a signal assigned to a $W^{5+}$ center and a signal assigned to an electron trap formed of cation in glass increase with an increase in the color degree, and it is therefore seen that the coloring is caused directly by the formation of these reducing species. For increasing the color degree, therefore, it is sufficient to reduce W ion in the glass, and for decreasing the color degree, it is sufficient to oxidize W ion. The coloring and decoloring based on the above mechanism proceed reversibly. It is considered that the coloring and decoloring phenomenon of Nb ion and Ti ion is also caused by a similar mechanism.

The present invention aims at controlling the color degree of not a glass in a molten state but a glass material that is cooled at least to a temperature equivalent to, or lower than, a softening point, such as a glass molded article or an optical element. A glass in a molten state can be colored or decolored for a relatively short period of time by adjusting an oxygen partial pressure of a melting atmosphere. When oxygen is used as a carrier for a redox reaction for changing the color degree of a glass molded material, it takes a very long time since oxygen ion in the glass has a very small diffusion coefficient. As a carrier for the redox reaction, therefore, it is preferred to use hydrogen ion that has a large diffusion coefficient in a glass. When hydrogen ion is used as a carrier, a glass can be rapidly colored or decolored as far as the internal center of the glass. Since a phosphate glass shows a large diffusion coefficient of hydrogen ion in the glass, it is suitable for a redox method using hydrogen ion as a carrier as compared with any other glass.

The coloring treatment can be carried out by heating a glass in a non-oxidizing atmosphere. The above redox reaction using a hydrogen ion as a carrier is preferred since the treatment time period can be decreased. Therefore, the above non-oxidizing atmosphere preferably includes a nitrogen gas atmosphere, an inert gas atmosphere and a reducing atmosphere such as an atmosphere formed by adding water vapor to such a non-oxidizing atmosphere or a hydrogen gas atmosphere. A mixture of nitrogen gas and an inert gas and an atmosphere formed by adding water vapor to such an atmosphere may be also used. When the above atmosphere is employed, the coloring treatment time period can be decreased. A non-oxidizing atmosphere containing water is characteristically easier to handle than a hydrogen gas atmosphere, and a hydrogen gas atmosphere has a characteristic feature that the coloring can be carried out at a higher rate so that the coloring can be made for a shorter period of time. The content of the water in the above non-oxidizing atmosphere is preferably set such that water vapor in the atmosphere has a partial pressure of $5 \times 10^4$ Pa or higher. In such a heat treatment, the reducing reaction on a glass surface spreads into a glass, and, for example, the entire glass having a thickness of several mm can be colored rapidly.

On the other hand, in the treatment of decreasing the color degree, the decoloring can be rapidly carried out by dissociating a hydrogen ion out of a glass in the form of $H_2O$. For example, a colored glass is heated in an oxidizing atmosphere such as atmosphere of air, to decolor the glass, whereby a colorless and transparent glass can be obtained. The oxidizing atmosphere includes an oxygen gas, a gas mixture containing an oxygen gas, such as atmosphere of air. While an ozone gas may be used as an oxidizing atmosphere, an oxygen gas, a gas mixture containing an oxygen gas and atmosphere of air are more preferred. In the treatment of decreasing the color degree, such as decoloring, the color degree of the entire glass can be rapidly changed by migration of a hydrogen ion as well. A phosphate glass is suitable for the above treatment, since it shows a large diffusion coefficient of a hydrogen ion. In the treatment of decreasing the color degree of a glass, preferably, the partial pressure of water vapor in the above atmosphere is adjusted to $10^4$ Pa or lower for rapidly carrying out the decoloring treatment. More preferably, the above partial pressure of water vapor is adjusted to $6 \times 10^3$ Pa or lower.

The treatment rate of each of the coloring and the decoloring can be increased by treatment at a high temperature. For decreasing a deformation caused by the heat treatment, however, the heating temperature for each of the coloring and the decoloring is preferably set a temperature equivalent to, or lower than, the softening point of a glass. For avoiding a change in form, further, the heating temperature is preferably set at a temperature equivalent to, or lower than, a glass transition temperature Tg. For an article that is required to have high-precision form accuracy such as a precision press-molded article or an optical element, preferably, the heat treatment is carried out in a temperature range in which the form accuracy of the article can be maintained. For this purpose, the heating temperature is more preferably adjusted to a "glass transition temperature Tg minus 10° C." or lower, more preferably to a "glass transition temperature minus 15° C." or lower, still more preferably to a "glass transition temperature Tg minus 25° C." or lower, and particularly preferably to a "glass transition temperature Tg minus 30° C." or lower.

The process for producing a transparent glass molded article by decoloring a press-molded article, which process is a process for the production of a glass molded article in the present invention, will be explained below.

For protecting a molding surface of a press mold from an oxidation at high temperatures during press-molding, there is widely employed a method using, as a press-molding atmosphere, a non-oxidizing atmosphere such as a nitrogen gas atmosphere, other inert gas atmosphere or a gas mixture atmosphere containing a nitrogen gas and an inert gas. In a precision press-molding method in which a glass molded article can be directly obtained as an end product such as an optical element without cutting or polishing or the aspherical surface of an aspherical lens can be formed by press-molding, the press-molding is carried out mostly in the above atmosphere. Since the above press-molding is carried out at a temperature higher than a glass transition temperature, a cation in a glass is reduced to color the glass due to the already explained mechanism. For an optical element such as a lens, a glass molded article is required to have high transparency, so that it is required to decolor the press-molded article. In the present invention, a molded article is decolored by heating the glass molded article in an oxidizing atmosphere such as atmosphere of air, and it is particularly preferred to carry out the heat treatment in a dry atmosphere. More preferably, the partial pressure of water vapor in the atmosphere is adjusted to $10^4$ Pa or lower, and still more preferably, the partial pressure of the water vapor is adjusted to $6 \times 10^3$ Pa or lower. For preventing deformation, the heating temperature is preferably a temperature equivalent to, or lower than, a glass transition temperature, more preferably "glass transition temperature minus 10° C." or lower, still more preferably "glass transition temperature minus 15° C." or lower, yet more preferably "glass transition temperature minus 25° C." or lower, particularly preferably "glass transition temperature minus 30° C." or lower. The decoloring treatment may be carried out such that annealing treatment of a press-molded article is performed at the same time. The annealing treatment can remove distortion of a glass and finely adjust a refractive index and an Abbe's number.

The material of the molding surface of a press mold includes silicon carbide (SiC), ultra hard alloys such as WC, hard carbon, a noble metal and an alloy of a noble metal (e.g., platinum alloy). Of these, SiC and hard carbon requires some expedient to take against oxidation at high temperatures during press-molding.

In the process for the production of a glass molded article, provided by the present invention, the following glasses can be used. In the precision press-molding, a molding glass material is molded in a state where it has a viscosity of $10^6$ to $10^{12}$ poise ($10^5$ to $10^{11}$ Pa·S).

As described already, when a hydrogen ion having a large diffusion rate in a glass is used as a carrier for a redox reaction, the hydrogen ion makes it possible to carry out the rapid coloring and decoloring of a glass. A phosphate glass exhibits a large diffusion coefficient of a hydrogen ion and is suitable for the above coloring and decoloring. Further, since oxidation and reduction of W ion, Nb ion or Ti ion in a glass causes the color degree of the glass, the method of the present invention can be applied to glasses containing $WO_3$, $Nb_2O_5$ and $TiO_2$. While the method of the present invention is suitable for a phosphate glass, the present invention can be applied to a silicate glass containing at least one oxide of $WO_3$, $Nb_2O_5$ and $TiO_2$ so that a colored molded article can be decolored and rendered colorless and transparent.

A high-quality $P_2O_5$—$WO_3$-containing glass, a $P_2O_5$—$Nb_2O_5$-containing glass and a $P_2O_5$—$TiO_2$-containing glass can be used as optical glasses having high-refractivity and high-dispersion properties. These optical glasses preferably have optical constants, a refractive index (nd) of at least 1.6 and an Abbe's number (vd) of 33 or less, more preferably a refractive index (nd) of 1.6 to 1.9 and an Abbe's number (vd) of 21 to 33, still more preferably a refractive index (nd) of 1.65 to 1.86 and an Abbe's number (vd) of 22 to 32.5.

As a precision press-molding glass, all of the $P_2O_5$—$WO_3$-containing glass, $P_2O_5$—$Nb_2O_5$-containing glass and $P_2O_5$—$TiO_2$-containing glass preferably have a glass transition temperature (Tg) of 540° C. or lower, more preferably 530° C. or lower, still more preferably 515° C. or lower.

The present invention can be suitably applied to the above-explained $P_2O_5$—$WO_3$-containing glass, $P_2O_5$—$Nb_2O_5$-containing glass and $P_2O_5$—$TiO_2$-containing glass. A $P_2O_5$—$WO_3$-containing glass in particular is also suitable as an optical glass having high-refractivity and high-dispersion properties. As a composition that satisfies the low-melting point property required of a precision press-molding glass in addition to the high-refractivity and high-dispersion properties, preferred is a glass having a composition containing, by mol %, 12 to 50% of $P_2O_5$, 2 to 45% of $WO_3$, 0 to 25% of $Nb_2O_5$, 0 to 22% of $TiO_2$, 0 to 30% of $Li_2O$, 0 to 33% of $Na_2O$, 0 to 25% of $K_2O$, 0 to 23% of $B_2O_3$, 0 to 25% of BaO and 0 to 20% of ZnO and having a $WO_3$ and $Nb_2O_5$ total content of 45 mol % or less.

$P_2O_5$ is a material for forming a network structure of the glass, and it is also an essential component for increasing the diffusion rate of a hydrogen ion to improve the coloring and decoloring rate. When the content of $P_2O_5$ is less than 12 mol %, devitrification increasingly tends to take place, and a glass may not be easily formed. When it exceeds 50 mol %, it is difficult to introduce components such as $WO_3$, etc., and the glass is caused to have an increased glass transition temperature, a low refractive index nd and an increased Abbe's number vd. The content of $P_2O_5$ is therefore preferably 12 to 50 mol %.

$WO_3$ is also an essential component, and it is a component effective for imparting the glass with low-melting point, high-refractivity and high-dispersion properties without using PbO that exerts a large environmental load. It is also a component for coloring and decoloring the glass by oxidation and reduction. $WO_3$ decreases the glass transition temperature and the sag temperature like an alkali metal oxide and works to increase the refractive index, and it also works to inhibit wettability between the glass and a mold during press-molding so that it improves the releasability of the glass from the mold. When the content of $WO_3$ is less than 2 mol %, the glass transition temperature and sag temperature increase, and the glass is liable to cause foaming during precision press-molding, and further, the effective coloring may come to be no longer possible. When the content of $WO_3$ exceeds 45 mol %, the viscosity of the glass at high temperature decreases, and it is sometimes difficult to produce a preform to be used in the precision press-molding. The content of $WO_3$ is therefore preferably 2 to 45 mol %.

$Nb_2O_5$ is an optional component that can be used for imparting the glass with high-refractivity high-dispersion properties without using PbO. However, the content of $Nb_2O_5$ exceeds 25 mol %, it not only causes the glass transition temperature and sag temperature to increases but also decreases the glass stability and high-temperature meltability. Further, the glass is liable to cause foaming during precision press-molding. Like $WO_3$, $Nb_2O_5$ is a component that causes coloring of the glass and is therefore a component that is an object of the coloring and decoloring treatment. The content of $Nb_2O_5$ is therefore preferably 0 to 25 mol %.

As described above, $WO_3$ and $Nb_2O_5$ are components for causing reversible coloring and decoloring. However, when the total content thereof exceeds 45 mol %, the decoloring is difficult. When the glass is colored, the total content of $WO_3$ and $Nb_2O_5$ is preferably at least 15 mol %.

$TiO_2$ is a component for increasing the refractive index and dispersion and improving the glass in anti-devitrification. When the content thereof exceeds 22 mol %, the glass is sharply degraded in anti-devitrification, and the glass transition temperature, sag temperature and liquidus temperature sharply increase. Like $WO_3$ and $Nb_2O_5$, $TiO_2$ is also a component that causes the glass to be colored and is therefore a component that is an object of the coloring and decoloring treatment. Therefore, $TiO_2$ may be added in an amount range of from 0 to 22 mol %.

$Li_2O$ is a component for improving the glass in anti-devitrification, decreasing the glass transition temperature, sag temperature and liquidus temperature, and improving the glass in high-temperature meltability. When the content thereof exceeds 30 mol %, the glass stability decreases, and it is difficult to attain high-refractivity high-dispersion properties. The content of $Li_2O$ is therefore preferably 0 to 30 mol %.

$Na_2O$ is also a component for improving the glass in anti-devitrification, decreasing the glass transition temperature, sag temperature and liquidus temperature and improving the glass in high-temperature meltability. When the content thereof exceeds 33 mol %, the glass stability decreases, and it is difficult to attain high-refractivity high-dispersion properties. The content of $Na_2O$ is therefore preferably 0 to 33 mol %.

$K_2O$ is also a component for improving the glass in anti-devitrification, decreasing the glass transition temperature, sag temperature and liquidus temperature and improving the glass in high-temperature meltability. When the content thereof exceeds 25 mol %, the glass stability decreases, and it is difficult to attain high-refractivity high-dispersion properties. The content of $K_2O$ is therefore preferably 0 to 25 mol %.

$B_2O_3$ is a component remarkably effective for improving the meltability and homogeneity of the glass, and it is a component that alters OH bondability inside the glass when added in a small amount and which inhibits formation of bubbles of the glass during press-molding. However, when the content thereof exceeds 23 mol %, the glass is liable to be unstable. The content of $B_2O_3$ is therefore preferably 0 to 23 mol %.

BaO is a component for increasing the refractive index of the glass and improving the glass in anti-devitrification, and it is a component that works to decrease the liquidus temperature. When a glass contains a large amount of $WO_3$, BaO works as a component that inhibits the irreversible coloring of the glass. When the content thereof exceeds 25 mol %, the glass sometimes comes to be unstable and poor in chemical durability. The content of BaO is therefore preferably 0 to 25 mol %.

ZnO is a component for increasing the refractive index and dispersion of the glass and decreasing the glass transition temperature, sag temperature and liquidus temperature. However, when the content thereof exceeds 20 mol %, the anti-devitrification of the glass may decrease, and the liquidus temperature may increase. Therefore, ZnO can be added in an amount range of from 0 to 20 mol %.

Of glasses having composition containing some components in preferred amount ranges, a more preferred glass composition has an $Li_2O$ content of 2 to 30 mol % and an $Na_2O$ content of 2 to 33 mol %.

In the above glass composition having an $Li_2O$ content of 2 to 30 mol % and an $Na_2O$ content of 2 to 33 mol %, a more preferred composition contains, by mol %, 5 to 25% of $Nb_2O_5$, 1 to 22% of $TiO_2$ and 0.5 to 23% of $B_2O_3$ and has a total alkali metal oxide content of 45 mol % or less and an alkaline earth metal oxide and ZnO total content of 35 mol % or less. In the above glass composition, a still more preferred composition contains, by mol %, 14 to 45% of $P_2O_5$, 5 to 40% of $WO_3$, 5 to 23% of $Nb_2O_5$, 1 to 15% of $TiO_2$, 5 to 27% of $Li_2O$, 2 to 33% of $Na_2O$, 0 to 15% of $K_2O$, 0.5 to 15% of $B_2O_3$, 0 to 23% of BaO and 0 to 17% of ZnO, and in this glass composition, particularly preferred first composition and second composition are as follows.

A first glass composition contains, by mol %, 17 to 30% of $P_2O_5$, 5 to 25% of $WO_3$, 5 to 23% of $Nb_2O_5$, 1 to 9% of $TiO_2$, 5 to 22% of $Li_2O$, 4 to 22% of $Na_2O$, 1 to 7% of $K_2O$, 1 to 10% of $B_2O_3$, 2 to 23% of BaO, 1 to 10% of ZnO and 0 to 1% of $Sb_2O_3$. In the first glass composition, a composition in which the total content of the above components is at least 98 mol % is more preferred, a composition in which the total content of the above components is at least 99 mol % is still more preferred, and a composition in which the total content of the above components is 100 mol % is particularly preferred.

A second glass composition contains, by mol %, 17 to 30% of $P_2O_5$, 5 to 25% of $WO_3$, 5 to 23% of $Nb_2O_5$, 1 to 9% of $TiO_2$, 5 to 22% of $Li_2O$, 5 to 33% of $Na_2O$, 1 to 10% of $B_2O_3$, 0 to 23% of BaO and 0 to 1% of $Sb_2O_3$. In the second glass composition, a composition in which the total content of the above components is at least 98 mol % is more preferred, a composition in which the total content of the above components is at least 99 mol % is still more preferred, and a composition in which the total content of the above components is 100 mol % is particularly preferred.

The above first and second glass compositions are the most preferred for obtaining optical glasses which accomplish the object of the present invention, which have high-refractivity high-dispersion properties, a refractive index (nd) of at least 1.6 and an Abbe's number (vd) of 33 or less and further have low-melting properties suitable for precision press-molding, a glass transition temperature of 540° C. or lower, and which are stable as a glass.

In addition to the above components, $SiO_2$, MgO, CaO, SrO, $Al_2O_3$, $Y_2O_3$, $La_2O_3$, $Gd_2O_3$, $ZrO_2$, $Ta_2O_5$, $Bi_2O_3$, $TeO_2$, $Cs_2O$ and $As_2O_3$ may be added as optional components. In this case, preferably, the content by mol % of each component is as follows. The content of $SiO_2$ is 0 to 5%, the content of MgO is 0 to 25%, the content of CaO is 0 to 25%, the content of SrO is 0 to 25%, the content of $Al_2O_3$ is 0 to 5%, the content of $Y_2O_3$ is 0 to 5%, the content of $La_2O_3$ is 0 to 6%, the content of $Gd_2O_3$ is 0 to 6%, the content of $ZrO_2$ is 0 to 6%, the content of $Ta_2O_5$ is 0 to 6%, the content of $Bi_2O_3$ is 0 to 6%, the content of $TeO_2$ is 0 to 6%, the content of $Cs_2O$ is 0 to 6% and the content of $As_2O_3$ is 0 to 1%.

In the glass to be used in the present invention, for improving the stability of the glass and attaining high-refractivity high-dispersion properties, the total content of $Li_2O$, $Na_2O$ and $K_2O$ is preferably 45 mol % or less, more preferably 10 to 45 mol %, still more preferably 12 to 43 mol %.

In any one of the above preferred glass compositions, the content of $Li_2O$ is desirably at least 9 mol %, more desirably at least 10 mol %.

When the glass is colored in the present invention, the total content of $WO_3$ and $Nb_2O_5$ that serve for coloring (particularly, reversible coloring) is preferably at least 15 mol %, and the total content of $WO_3$, $Nb_2O_5$ and $TiO_2$ is preferably at least 25 mol %.

In a $P_2O_5$—$WO_3$-containing glass that has not yet been explained with regard to the above preferred compositions, the content of $Li_2O$ is desirably 9 to 30 mol %, more desirably 10 to 30 mol %, for forming a glass that is suitable for precision press-molding.

Further, the process for the production of a glass molded article is suitable for producing a glass molded article formed of a glass containing 2,000 ppm or less of each of $Sb_2O_3$ and $As_2O_3$, more suitable for producing a glass molded article formed of a glass containing 200 ppm or less of $As_2O_3$, still more suitable for producing a glass molded article formed of a glass containing no $As_2O_3$ and containing 1,000 ppm or less of $Sb_2O_3$, and particularly suitable for producing a glass molded article formed of a glass containing no $As_2O_3$ and containing 500 ppm or less of $Sb_2O_3$. While $Sb_2O_3$ and $As_2O_3$ are added as a refining agent to a glass, they are strong oxidizing agents, so that they work to prevent reduction of W ion, Nb ion and Ti ion. In consideration for the environment, however, a glass having no content of $As_2O_3$ or having a small content thereof, if any, is desired, and such a glass is easily colorable since W ion, Nb ion and Ti ion in the glass are reduced during precision press-molding. On the other hand, $Sb_2O_3$ and $As_2O_3$ are strong oxidizing agents and therefore oxidize the molding surface of a press mold, so that it is one factor that decreases the lifetime of the mold. Therefore, the content of each of the $Sb_2O_3$ and $As_2O_3$ is decreased as described above, and the process of the present invention is applied. In this case, the lifetime of a press mold can be lengthened while obtaining transparent press-molded articles.

According to the present invention, further, there is provided a decolored optical element obtained by the above process for the production of a glass molded article, provided by the present invention. There is also provided a method of treating a glass, which comprises heat-treating a colored glass containing at least one oxide of $WO_3$ and $Nb_2O_5$ in an oxidizing atmosphere, to decolor the glass. And, there is further provided a method of treating a glass, which comprises heat-treating a glass containing at least one oxide selected from $WO_3$, $Nb_2O_5$ or $TiO_2$ in a non-oxidizing atmosphere, to color the glass.

The above treatment methods are preferably applied to a glass containing $P_2O_5$ in particular.

In the present invention, the color degree can be locally changed by local contact to an atmosphere during the heat treatment or local heating. When such a treatment method is employed, a desired color pattern or a desired distribution of the color degree can be obtained. In the above method, a desired pattern corresponding to information to be recorded can be recorded in a glass, and the above information can be stored in the glass. Therefore, the above glass material can be used as an optical storage material.

Further, since the refractive index changes to a slight extent depending upon the color degree, a refractive index distribution type optical element such as a GRIN lens can be produced.

In the present invention, since a tungsten-containing phosphate glass contains no fine particles that constitute light-scattering sources, unlike a photochromic glass containing fine particles such as fine particles of a metal halide, the light scattering loss is remarkably small as compared with a photochromic glass, and a low-loss optical element can be produced.

As explained above, the process and the method of the present invention are suitable for an optical glass, and are particularly suitable for a glass containing no lead.

EXAMPLES

The present invention will be explained more in detail with reference to Examples hereinafter, while the present invention shall not be limited by these Examples.

Tables 1, 2, 3 and 4 show compositions, optical properties and thermal properties of glasses that were treated for coloring and decoloring in Examples. All of these glasses are optical glasses and are suitable for precision press-molding.

Example 1

Figure 1:
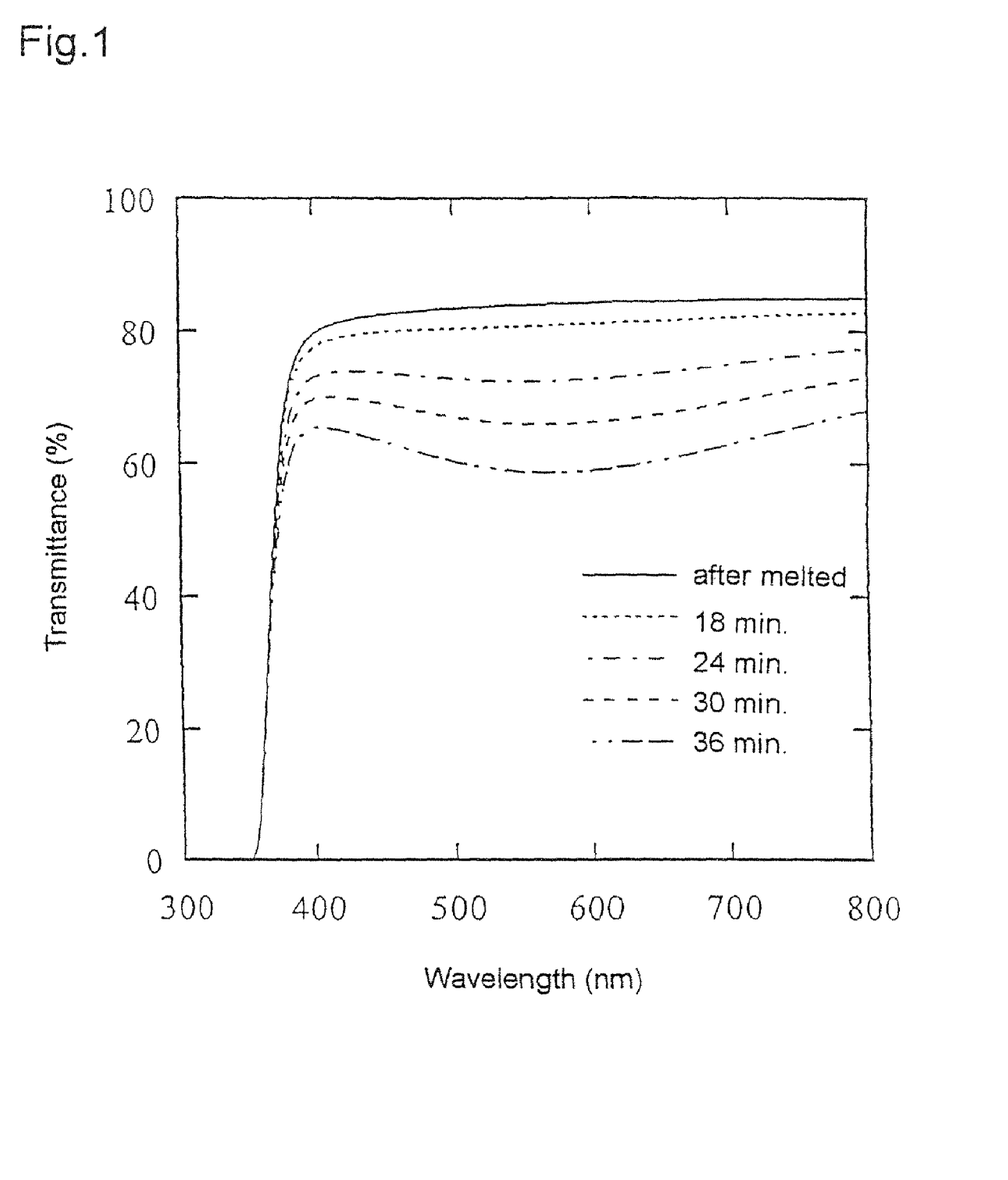
FIG. 1 is a spectrum showing one example of the relationship between a heat treatment time period and a transmittance when a glass is heat-treated in a nitrogen atmosphere.

A glass having a composition 1 shown in Table 1 (22.8 mol % of $P_2O_5$, 15.2 mol % of $WO_3$, 15.9 mol % of $Nb_2O_5$, 10.1 mol % of $Li_2O$, 9.7 mol % of $Na_2O$, 2.5 mol % of $K_2O$, 16.2 mol % of BaO and 7.6 mol % of $B_2O_3$) was prepared by melting at 1,100° C. After gradually cooled, the glass had a yellowish color. The glass had properties as shown in Table 1. The glass was formed into a sheet having a thickness of 2 mm by cold working, and the glass having a sheet form was heat-treated in a nitrogen gas atmosphere at 560° C. As the time period of the heat treatment increased, circumferential areas of the glass began to turn blackish purple and the entire glass was colored in several tens minutes. FIG. 1 shows a change of a transmittance spectrum with the passage of the heat treatment time. As shown in FIG. 1, the minimum transmittance was controlled to be 62% by controlling the heat treatment time period.

Glasses having compositions 2 to 28 shown in Tables 1 to 6 were successfully colored by heat treatment in a nitrogen gas atmosphere.

Further, when the atmosphere for the heat treatment in this Example was changed from the nitrogen gas atmosphere to a non-oxidizing gas or reducing gas atmosphere such as a hydrogen gas atmosphere, a gas mixture atmosphere of hydrogen gas and nitrogen gas or a gas mixture atmosphere of hydrogen gas and an inert gas, the glasses were also colored. Further, when water vapor was added to the above atmospheres, the glasses were also colored.

After the above heat treatment, no change was found in the glass compositions.

Example 2

Figure 2:
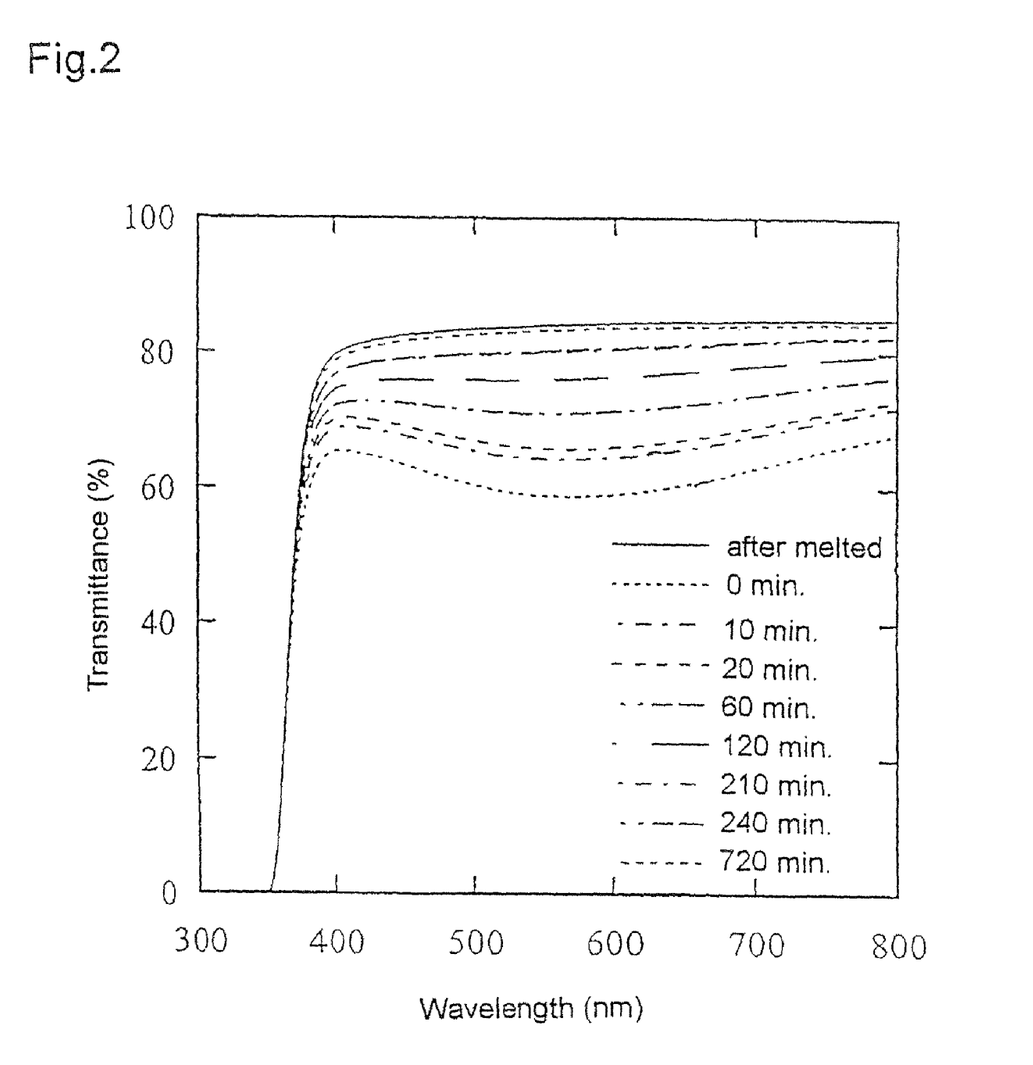
FIG. 2 is a spectrum showing one example of the relationship between a heat treatment time period and a transmittance when a colored glass is heat-treated in atmosphere of air.

The colored glass obtained by heat treatment in a nitrogen gas atmosphere for 36 minutes in Example 1 was heat-treated under atmosphere of air at 480° C. FIG. 2 shows a change of a transmittance spectrum in the heat treatment under atmosphere of air. With an increase in the time period of the heat treatment, the glass colored in blackish purple came to be lighter in color. After 4 hours, the glass came to be nearly colorless.

The glasses having compositions 2 to 28, which were treated for coloring in Example 1, were similarly heat-treated under atmosphere of air, whereby the color degrees of the glasses were decreased and the glasses were decolored and rendered transparent. After the heat treatment, further, no change was found in the glass compositions. When the atmosphere for the heat treatment is altered as described above, the reversible coloring and decoloring can be performed.

Example 3

Figure 3:
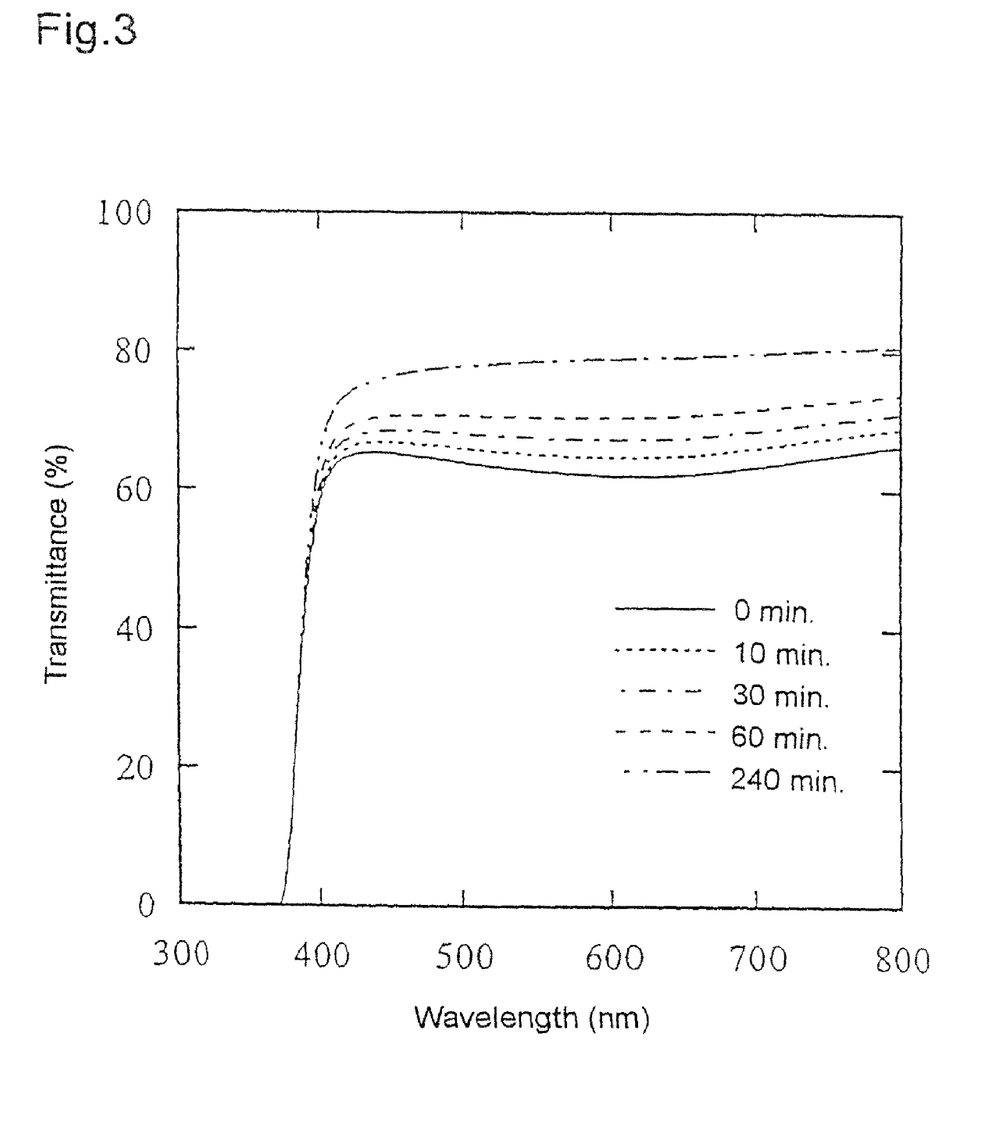
FIG. 3 is a spectrum showing one example of the relationship between a heat treatment time period and a transmittance when a glass colored during melting is heat-treated in atmosphere of air.

A glass having a composition containing, by mol %, 23.9% of $P_2O_5$, 19.8% of $WO_3$, 14.8% of $Nb_2O_5$, 4.9% of $TiO_2$, 15.2% of $Li_2O$, 5.8% of $Na_2O$, 2.5% of $K_2O$, 11.1% of BaO and 2.5% of $B_2O_3$ was prepared by melting at 1,100° C. The obtained glass had a blackish blue color. The glass was formed into a sheet having a thickness of 2 mm by cold working, and the glass having a sheet form was heat-treated under atmosphere of air at 515° C. As the time period of the heat treatment increased, the blackish blue color of the glass came to be lighter. FIG. 3 shows a change of a transmittance spectrum in the heat treatment under atmosphere of air. As shown in FIG. 3, the minimum transmittance was controlled to be in the range of from 64% to 80% by carrying out the heat treatment for a period of time up to 6 hours.

There was found no change that was caused on the glass composition by the above heat treatment.

Example 4

A glass having a composition 16 containing, by mol %, 24.0% of $P_2O_5$, 11.0% of $WO_3$, 19.0% of $Nb_2O_5$, 5.0% of $TiO_2$, 12.0% of $Li_2O$, 9.0% of $Na_2O$, 2.0% of $K_2O$, 7.0% of ZnO, 8.0% of BaO and 3.0% of $B_2O_3$ was hot-formed into an ellipsoidal material having a diameter of approximately 10 mm and a height of approximately 6 mm, and the ellipsoidal material was cooled to prepare a preform. The preform was colorless and transparent. The preform was re-heated in a nitrogen gas atmosphere and also precision press-molded into a convex meniscus lens having a diameter of approximately 17 mm with a mold made of SiC. The glass after the molding had the color of black. The thus-molded article was heat-treated in atmosphere of air at 480° C. which was lower than the glass transition temperature Tg 516° C. of the glass by approximately 30° C., whereby the glass molded article was decolored and a colorless and transparent convex meniscus lens was obtained. There was found no change that was caused on the molded article by the heat treatment, and the molded article maintained its form accuracy.

For preventing the fusion of the glass and the mold during the press-molding, there may be used a preform having a surface formed of a carbon film. When the carbon-film-applied preform is used, the carbon film remains on the surface of the molded article after the precision press-molding, and the remaining carbon film can be oxidized and removed by heat treatment in the above atmosphere of air or an oxidizing atmosphere.

Glasses having compositions 1 to 15 and 17 to 28 were formed into convex meniscus lenses by precision press-molding in the same manner as that described above, and the lenses were heat-treated at a temperature lower than their glass transition temperatures by approximately 30° C., to give colorless and transparent convex meniscus lenses.

$Sb_2O_3$ was added to each of the above compositions 1 to 28 to obtain glasses having an $Sb_2O_3$ content of 100 ppm, 200 ppm, 500 ppm and 1,000 ppm, and the glasses were similarly press-molded to obtain molded articles. Thus-obtained molded articles were heat-treated under atmosphere of air to give colorless and transparent optical elements.

The glass molded article that can be produced is not limited to a convex meniscus lens, and colorless and transparent lenses having any form can be produced regardless of a spherical lens and an aspherical lens.

Example 5

A mask made of aluminum in a desired pattern was formed on the surface of each of colorless sheet-shaped glasses made of glasses having compositions 1 to 28 shown in Tables 1 to 6, and the sheet-shaped glasses were heated in a reducing atmosphere having an elevated water vapor partial pressure, whereby each sheet-shaped glass was colored in a pattern corresponding to a pattern of opening portions of the mask. Further, a mask made of aluminum in a desired pattern was formed on the surface of each of colored sheet-shaped glasses made of glasses having the compositions 1 to 28, and the sheet-shaped glasses were heated in atmosphere of air, whereby regions discolored in a pattern corresponding to a pattern of opening portions of the mask were formed on/in each sheet-shaped glass.

In the above treatment, regions having different color degrees were formed with the mask. Further, other local heating, for example, local irradiation with laser light, was carried out, whereby the color degree was changed on heated portions alone.

Since a colored pattern can be formed as described above, a colored pattern corresponding to information to be stored can be recorded on the glass, and the recorded information can be read on the basis of the above colored pattern. The above glass can be therefore used as an optical storage material, and the above coloring and decoloring methods can be applied to writing information on/in the optical storage material and erasing information.

Further, since the above coloring and decoloring proceed on the basis of diffusion of a carrier of a redox reaction, a distribution of the color degree in the depth direction from the glass surface can be formed by a method of adjusting the heat treatment time period, or the like. Further, a distribution of the color degree can be formed by providing the interior of the glass with a temperature distribution during heat treatment.

Further, since the refractive index changes depending upon a change in the color degree, the present invention can be applied to optical storage using a change in refractive index, and a refractive index distribution type optical element such as a GRIN lens having a refractive index distribution can be also produced by providing a distribution of the color degree.

When it is required to color a glass as a whole, the glass is press-molded in the non-oxidizing atmosphere explained in the above Examples, whereby a colored glass molded material can be obtained. When the above glass molded material is locally treated for coloring or decoloring or subjected to the formation of a distribution of the color degree, the above optical storage material or the above refractive index distribution type optical element can be also produced.

When a silicate glass containing $TiO_2$ was treated in the same manner as in Examples 1 to 5, the silicate glass gave the same effects although the coloring and decoloring rate thereof differed. It is considered that silicate glasses containing $WO_3$ and $Nb_2O_5$ other than $TiO_2$ can give the same effects.

TABLE 1

| Composition | 1 | 2 | 3 | 4 | 5 |
|---|---|---|---|---|---|
| $P_2O_5$ | 22.8 | 23.6 | 18.1 | 25.0 | 23.0 |
| $WO_3$ | 15.2 | 15.7 | 20.6 | 6.0 | 17.5 |
| $Nb_2O_5$ | 15.9 | 16.5 | 16.2 | 23.0 | 17.5 |
| (A) | 31.1 | 32.2 | 36.8 | 29.0 | 35.0 |
| $TiO_2$ | 0.0 | 0.0 | 0.0 | 0.0 | 0.0 |
| (B) | 31.1 | 32.2 | 36.8 | 29.0 | 35.0 |
| $Li_2O$ | 10.1 | 13.1 | 12.9 | 12.0 | 12.0 |
| $Na_2O$ | 9.7 | 7.4 | 7.3 | 10.0 | 9.0 |
| $K_2O$ | 2.5 | 2.6 | 2.6 | 3.0 | 2.0 |
| (C) | 22.3 | 23.1 | 22.8 | 25.0 | 23.0 |
| ZnO | 0.0 | 0.0 | 0.0 | 0.0 | 6.0 |
| BaO | 16.2 | 16.7 | 16.5 | 16.0 | 8.0 |
| (D) | 16.2 | 16.7 | 16.5 | 16.0 | 14.0 |
| $B_2O_3$ | 7.6 | 4.4 | 5.8 | 5.0 | 5.0 |
| $GeO_2$ | 0.0 | 0.0 | 0.0 | 0.0 | 0.0 |
| $Ta_2O_5$ | 0.0 | 0.0 | 0.0 | 0.0 | 0.0 |
| Total | 100.0 | 100.0 | 100.0 | 100.0 | 100.0 |
| Tg (° C.) | 511 | 510 | 493 | 516 | 486 |
| nd | 1.80963 | 1.81467 | 1.85328 | 1.82159 | 1.83865 |
| νd | 26.6 | 26.4 | 24.8 | 25.6 | 24.1 |

TABLE 2

| Composition | 6 | 7 | 8 | 9 | 10 |
|---|---|---|---|---|---|
| $P_2O_5$ | 22.0 | 22.4 | 24.2 | 20.0 | 24.0 |
| $WO_3$ | 34.2 | 13.0 | 20.0 | 10.0 | 12.0 |
| $Nb_2O_5$ | 13.5 | 18.6 | 15.0 | 20.0 | 18.0 |
| (A) | 47.7 | 21.6 | 35.0 | 30.0 | 30.0 |
| $TiO_2$ | 0.0 | 5.2 | 5.0 | 5.0 | 5.0 |
| (B) | 47.7 | 26.8 | 40.0 | 35.0 | 35.0 |
| $Li_2O$ | 0.0 | 12.5 | 15.3 | 12.0 | 12.0 |
| $Na_2O$ | 13.7 | 13.0 | 5.8 | 10.0 | 9.0 |
| $K_2O$ | 14.2 | 2.6 | 2.5 | 3.0 | 2.0 |
| (C) | 21.5 | 28.1 | 23.6 | 25.0 | 23.0 |
| ZnO | 0.0 | 0.0 | 0.0 | 0.0 | 5.0 |
| BaO | 0.0 | 11.2 | 10.8 | 15.0 | 10.0 |
| (D) | 0.0 | 11.2 | 10.8 | 15.0 | 15.0 |
| $B_2O_3$ | 2.4 | 1.5 | 1.4 | 5.0 | 3.0 |
| $GeO_2$ | 0.0 | 0.0 | 0.0 | 0.0 | 0.0 |
| $Ta_2O_5$ | 0.0 | 0.0 | 0.0 | 0.0 | 0.0 |
| Total | 100.0 | 100.0 | 100.0 | 100.0 | 100.0 |
| Tg (° C.) | 539 | 510 | 515 | 508 | 503 |
| nd | 1.80025 | 1.84764 | 1.85023 | 1.85952 | 1.84264 |
| νd | 23.3 | 23.6 | 23.3 | 23.7 | 23.7 |

TABLE 3

| Composition | 11 | 12 | 13 | 14 | 15 |
|---|---|---|---|---|---|
| $P_2O_5$ | 24.0 | 24.0 | 24.0 | 23.6 | 15.0 |
| $WO_3$ | 11.0 | 12.0 | 12.0 | 20.8 | 17.7 |
| $Nb_2O_5$ | 19.0 | 18.0 | 18.0 | 4.7 | 3.5 |
| (A) | 30.0 | 30.0 | 30.0 | 25.5 | 21.2 |
| $TiO_2$ | 5.0 | 4.5 | 5.0 | 3.4 | 7.7 |
| (B) | 35.0 | 34.5 | 35.0 | 28.9 | 28.9 |
| $Li_2O$ | 9.0 | 12.0 | 16.0 | 0.0 | 0.0 |
| $Na_2O$ | 12.0 | 7.0 | 10.0 | 22.1 | 19.7 |
| $K_2O$ | 2.0 | 2.0 | 2.0 | 5.5 | 1.0 |
| (C) | 23.0 | 21.0 | 28.0 | 27.6 | 20.7 |
| ZnO | 7.0 | 6.5 | 5.0 | 0.0 | 0.0 |
| BaO | 8.0 | 11.0 | 5.0 | 4.5 | 4.0 |
| (D) | 15.0 | 17.5 | 10.0 | 4.5 | 4.0 |
| $B_2O_3$ | 3.0 | 3.0 | 3.0 | 4.9 | 22.0 |
| $GeO_2$ | 0.0 | 0.0 | 0.0 | 10.5 | 9.4 |
| $Ta_2O_5$ | 0.0 | 0.0 | 0.0 | 0.0 | 0.0 |
| Total | 100.0 | 100.0 | 100.0 | 100.0 | 100.0 |
| Tg (° C.) | 507 | 508 | 486 | 494 | 479 |
| nd | 1.84817 | 1.85050 | 1.84151 | 1.70266 | 1.72277 |
| vd | 23.27 | 23.7 | 23.3 | 32.3 | 26.5 |

TABLE 4

| Composition | 16 | 17 | 18 | 19 | 20 | 21 |
|---|---|---|---|---|---|---|
| $P_2O_5$ | 24.0 | 13.6 | 16.5 | 14.8 | 20.7 | 27.1 |
| $WO_3$ | 11.0 | 16.6 | 23.0 | 18.7 | 31.5 | 16.4 |
| $Nb_2O_5$ | 19.0 | 6.0 | 6.4 | 5.1 | 9.7 | 7.4 |
| (A) | 30.0 | 22.6 | 29.4 | 23.8 | 41.2 | 23.8 |
| $TiO_2$ | 5.0 | 9.4 | 10.1 | 20.9 | 6.0 | 2.7 |
| (B) | 35.0 | 32.0 | 39.5 | 44.7 | 47.2 | 36.5 |
| $Li_2O$ | 12.0 | 0.0 | 0.0 | 0.0 | 0.0 | 12.5 |
| $Na_2O$ | 9.0 | 20.2 | 21.7 | 20.7 | 25.8 | 28.9 |
| $K_2O$ | 2.0 | 17.0 | 4.0 | 1.1 | 4.8 | 0.0 |
| (C) | 23.0 | 37.2 | 25.7 | 21.8 | 30.6 | 41.4 |
| ZnO | 7.0 | 0.0 | 6.6 | 0.0 | 0.0 | 0.0 |
| BaO | 8.0 | 2.5 | 0.0 | 4.2 | 0.0 | 0.0 |
| (D) | 15.0 | 2.5 | 6.6 | 4.2 | 0.0 | 0.0 |
| $B_2O_3$ | 3.0 | 9.9 | 6.7 | 4.7 | 0.0 | 5.0 |
| $GeO_2$ | 0.0 | 4.8 | 5.0 | 9.8 | 0.0 | 0.0 |
| $Ta_2O_5$ | 0.0 | 0.0 | 0.0 | 0.0 | 1.5 | 0.0 |
| Total | 100.0 | 100.0 | 100.0 | 100.0 | 100.0 | 100.0 |
| Tg (° C.) | 507 | 404 | 494 | 532 | 511 | 435 |
| nd | 1.84521 | 1.70035 | 1.79765 | 1.84190 | 1.82682 | 1.69127 |
| vd | 23.3 | 29.1 | 23.7 | 22.7 | 22.3 | 31.27 |

TABLE 5

| Composition | 22 | 23 | 24 | 25 | 26 |
|---|---|---|---|---|---|
| $P_2O_5$ | 24.0 | 24.0 | 24.0 | 24.0 | 23.5 |
| $WO_3$ | 8.0 | 7.0 | 8.0 | 7.0 | 7.8 |
| $Nb_2O_5$ | 18.0 | 19.0 | 18.0 | 19.0 | 16.4 |
| (A) | 26.0 | 26.0 | 26.0 | 26.0 | 24.2 |
| $TiO_2$ | 6.0 | 6.0 | 6.0 | 6.0 | 5.9 |
| (B) | 32.0 | 32.0 | 32.0 | 32.0 | 30.1 |
| $Li_2O$ | 22.0 | 19.5 | 18.0 | 18.8 | 15.3 |
| $Na_2O$ | 11.0 | 11.5 | 11.0 | 11.2 | 14.2 |
| $K_2O$ | 2.0 | 2.0 | 2.0 | 2.0 | 2.0 |
| (C) | 35.0 | 33.0 | 31.0 | 32.0 | 31.5 |
| ZnO | 3.0 | 2.0 | 5.0 | 2.0 | 2.9 |
| BaO | 3.0 | 6.0 | 5.0 | 6.0 | 9.1 |
| (D) | 6.0 | 8.0 | 10.0 | 8.0 | 12.0 |
| $B_2O_3$ | 3.0 | 3.0 | 3.0 | 4.0 | 2.9 |
| $GeO_2$ | 0.0 | 0.0 | 0.0 | 0.0 | 0.0 |
| $Ta_2O_5$ | 0.0 | 0.0 | 0.0 | 0.0 | 0.0 |
| Total | 100.0 | 100.0 | 100.0 | 100.0 | 100.0 |
| Tg (° C.) | 467 | 476 | 473 | 478 | 471 |
| nd | 1.82121 | 1.82694 | 1.82688 | 1.82668 | 1.80546 |
| vd | 24.00 | 24.00 | 23.97 | 24.02 | 25.43 |

TABLE 6

| Composition | 27 | 28 |
|---|---|---|
| $P_2O_5$ | 23.7 | 23.8 |
| $WO_3$ | 7.6 | 7.8 |
| $Nb_2O_5$ | 16.2 | 16.0 |
| (A) | 23.8 | 23.8 |
| $TiO_2$ | 5.9 | 5.9 |
| (B) | 29.7 | 29.7 |
| $Li_2O$ | 19.3 | 19.7 |
| $Na_2O$ | 11.2 | 10.8 |
| $K_2O$ | 2.0 | 2.0 |
| (C) | 32.5 | 32.5 |
| ZnO | 2.9 | 2.9 |
| BaO | 7.9 | 8.1 |
| (D) | 10.8 | 11.0 |
| $B_2O_3$ | 3.4 | 2.9 |
| $GeO_2$ | 0.0 | 0.0 |
| $Ta_2O_5$ | 0.0 | 0.0 |
| Total | 100.0 | 100.0 |
| Tg (° C.) | 466 | 465 |
| nd | 1.80558 | 1.80591 |
| vd | 25.46 | 25.48 |

Notes to Tables 1 to 6:

(A) shows a total content of $WO_3$ and $Nb_2O_5$, (B) shows a total content of $WO_3$, $Nb_2O_5$ and $TiO_2$, (C) shows a total content of $Li_2O$, $Nb_2O_5$ and $K_2O$, and (D) shows a total content of ZnO and BaO. Each content and each total content are shown by mol %.

Tg shows a glass transition temperature, nd shows a refractive index, and vd shows an Abbe's number.

EFFECT OF THE INVENTION

According to the present invention, there can be provided the method of controlling the color degree of a glass containing $WO_3$, $Nb_2O_5$ or $TiO_2$, particularly a phosphate glass.

Particularly, a glass colored by press-molding the above glass having high-refractivity and high-dispersion properties and having usefulness as an optical glass in a non-oxidizing atmosphere can be decolored by a remarkably simple method, and a colorless and transparent glass molded article can be produced. The above term "colorless and transparent" means that the color degree and transmittance of a glass molded article in a visible light region satisfy requirements that lenses as optical elements are required to satisfy. In the precision press-molding, the method of press-molding in a non-oxidizing atmosphere is effective for improving the lifetime of a mold and preventing the fusion of a glass and a mold. It is therefore inevitable to heat the above glass in a non-oxidizing atmosphere, and a colored glass molded article is obtained.

According to the present invention, however, the colored glass can be decolored, and the present invention can overcome the coloring problem of a molded article that is a problem in precision press-molding a glass containing $WO_3$, $Nb_2O_5$ or $TiO_2$, particularly a phosphate glass.

According to the present invention, further, the color degree of a glass can be locally changed by local heat-treatment of the glass or by bringing part of the glass to an atmosphere during heat treatment, so that a desired colored pattern or a desired color degree distribution can be formed on/in the glass. According to the above method, the glass can be used as an optical storage material. Further, a refractive index distribution is also formed depending upon the distribution of the color degree, so that a refractive index distribution type optical element can be produced by forming a desired color degree distribution in the glass.

What is claimed is:

1. A process for producing a glass molded article formed of a phosphate glass containing $P_2O_5$ in an amount between 12 to 50 mol %, and optionally at least one oxide selected from WO3, $Nb_2O_5$ or $TiO_2$, which comprises producing a glass molded article formed of said glass by press molding said glass at a temperature higher than a glass transition temperature in a non-oxidizing atmosphere to reduce one at least one of a W ion, a Nb ion, or a Ti ion in the glass and to thereby produce a colored glass molded article, and then heat- treating said colored glass molded article, wherein a coloring degree of said colored glass molded article after the heat treatment is decreased by employing an oxidizing atmosphere as an atmosphere in which said glass molded article is heat-treated.

2. The process for producing a glass molded article as recited in claim 1, wherein the partial pressure of water vapor in the atmosphere is controlled.

3. The process for producing a glass molded article as recited in claim 1, wherein a partial pressure of water vapor in the oxidizing atmosphere is adjusted to $10^4$ Pa or lower.

4. The process for producing a glass molded article as recited in claim 1, wherein said glass has $Sb_2O_3$ and $As_2O_3$ contents of 2,000 ppm or less each.

5. The process for producing a glass molded article as recited in claim 1, wherein the heat-treatment is carried out at a glass transition temperature or lower.

* * * * *